United States Patent [19]

Neville et al.

[11] 4,136,345
[45] Jan. 23, 1979

[54] OBJECT DEFLECTION SENSOR

[75] Inventors: Mark H. Neville, Lexington, Ky.; Thomas S. Taylor, Atlanta, Ga.

[73] Assignee: International Business Machines Corporation, Armonk, N.Y.

[21] Appl. No.: 847,453

[22] Filed: Oct. 31, 1977

[51] Int. Cl.² ............................................. G01D 15/18
[52] U.S. Cl. ....................................................... 346/75
[58] Field of Search .......................................... 346/75

[56] References Cited

U.S. PATENT DOCUMENTS

| 3,886,564 | 5/1975 | Naylor et al. | 346/75 |
| 4,060,813 | 11/1977 | Yamada et al. | 346/75 |

OTHER PUBLICATIONS

Casler, D. H. et al., Deflection Sensor for Optical Scanners, IBM Technical Disclosure Bulletin, Jun. 1972, vol. 15, No. 1, pp. 5-6.
Neville, M. H. et al., Optical Drop-Deflection Sensor, IBM Technical Disclosure Bulletin, Nov. 1976, vol. 19, No. 6, p. 2134.

Primary Examiner—George H. Miller, Jr.
Attorney, Agent, or Firm—William J. Dick

[57] ABSTRACT

An ink drop height sensing device for an ink jet recording apparatus, the apparatus including a nozzle for forming and propelling a stream of ink drops towards a recording media in a predetermined deflection plane. A light source on one side of the intended path or trajectory in the plane of deflection of the ink drops impinges upon a mask located on the opposite side of the plane, which mask is aligned with a light sensitive device such as a phototransistor located behind the mask. The mask includes first, second and third line sensors, in the illustrated instance serially arranged slots with at least two of the slots being in parallel relation, the third slot being inclined with respect to the parallel slots and positioned with respect to them so that at a predetermined point along its length, it is a predetermined distance from the next adjacent slot relative to the distance between the two parallel slots. The phototransistor is coupled to a timer for comparing the time intervals for the passage of the ink drop between the parallel slots which is compared with the time taken for passage between one of the parallel slots and the inclined slot. If the time of the drop travel between the parallel slots is determined, (the distance being fixed), and the time of drop travel between one of the parallel slots and the inclined slot is compared to that time interval, dependent upon whether the time measurement is longer or shorter, then it may be determined whether the drop is high or low in the deflection plane and suitable correction may be employed to bring the deflected ink drops to their predetermined deflection height or trajectory path.

29 Claims, 10 Drawing Figures

OBJECT DEFLECTION SENSOR

The purpose of this abstract is to enable the public and the Patent Office to determine rapidly the subject matter of the technical disclosure of the application. This abstract is neither intended to define the invention of the application nor is it intended to be limiting as to the scope thereof.

SUMMARY OF THE INVENTION AND STATE OF THE PRIOR ART

The present invention relates to an object deflection sensor for detecting the deviation of the flight path of an object from a predetermined flight path, and more particularly relates to an ink drop height sensing device for an ink jet recording apparatus to permit precise adjustment of the height of the drop in accordance with the reading obtained from the height sensing apparatus.

R. G. Sweet in a technical report numbered 1722-1, Stanford University, CA (1964) in an article entitled "High Frequency Recording With Electrostatically Deflected Ink Jets," taught a method of forming, charging, and electrostatically deflecting a high speed stream of ink drops to produce high frequency oscillograph traces in a direct writing signal recording system. In the system developed by Sweet, each drop is given an electrostatic charge that is a function of the instantaneous value of the electrical input signal to be recorded. The drop is then deflected from its normal path by an amount that depends upon the magnitude of its charge and in a direction that depends upon the polarity of the charge. As deflected drops are deposited on a strip of moving chart paper, a trace is formed that represents the input signal. (See also U.S. Pat. No. 3,576,275, 1971 R. G. Sweet "Fluid Droplet Recorder"). U.S. Pat. No. 3,298,030 (1967) issued to A. M. Lewis and A. D. Brown and entitled "Electrically Operated Character Printer" extended the technique to permit the printing of characters. This was accomplished by storing in binary form the character images in a character generator and then employing an encoded signal which addresses the character generator to select the desired character. The binary image of that character is then used to generate the drop charging signals necessary to deflect drops to the appropriate character matrix positions.

Basically the printing process operates as illustrated in FIG. 10. Conductive ink under pressure is forced through a small diameter nozzle to form an ink jet. The ink jet conventionally breaks up into a stream of drops of somewhat random size and spacing. The drop formation can be controlled however by vibrating the ink within the nozzle cavity at a fixed ultrasonic frequency. The pressure waves developed cause the jet to break up into a stream of drops of uniform size and spacing at a well defined distance from the nozzle. A voltage applied to an electrode circumscribing the breakup point induces a charge of a specific predetermined magnitude on the drop as it is formed. The charge retained by the drops throughout its flight to the print surface, passes through an electrostatic field formed by a fixed high voltage between a pair of horizontally disposed deflection plates. Inasmuch as the charge on each ink drop is controlled individually, a drop may be deflected vertically any desired amount. In the instance where the drops are deflected vertically from bottom to top, one column of dots or spaces is referred to as a scan. In forming a character, if a particular space in a scan is to be left blank, it is blanked by leaving the drops uncharged, the uncharged drops passing between the high voltage deflection plates without deflection and the uncharged drops are then intercepted by a gutter and recycled to the ink reservoir.

One of the principle parameters to be controlled in the printer is the height of the ink droplet in forming the character to be printed on the printed surface. By looking at the prior art FIG. 10, the deflection of a single drop is dependent upon a number of factors, including the charge on the drop, the mass of the drop, the voltage on the deflection plates, the separation of the plates, the length of the deflection plates, and the throw distance (that is the distance from the deflection plate entry to the paper plane), as well as the drop velocity. The deflection of a single drop (assuming parallel deflection plates and a uniform electric field and neglecting aerodynamic effects) is:

$$x_d = \frac{Q_d V_{dp}}{m_d s_{dp} v_d^2} l_{dp} z_p - \frac{l_{dp}}{2},$$

where
$x_d$ = drop deflection
$Q_d$ = the drop charge
$V_{dp}$ = deflection plate voltage
$m_d$ = the drop mass
$s_{dp}$ = deflection plate sense spacing
$v_d$ = drop velocity
$l_{dp}$ = deflection plate length
$z_p$ = the distance from the deflection plate entry to the print plane By way of background, the drop charge must be variable over a sufficient range to allow vertical deflection of the drops over the height of the character matrix chosen. In the IBM 66/40 Ink Jet Printer, a maximum charge electrode voltage of 200 volts is utilized, the upper limit on the charge being necessary to prevent explosion of the drop which will occur if the electrostatic energy exceeds the energy due to surface tension. Another limit on the charge is that the mutual electrostatic repulsion among drops may become so large that drop alignment relative to the jet axis becomes unstable whereby any small radial disturbance on the drop at breakup causes the stream to disperse at some distance down the jet axis. In a like manner, the relative position of the printhead elements between the nozzle and the paper plane is critical. The charge electrode location relative to the nozzle is chosen to center the electrode around the stream breakup point while the spacing between the nozzle and the charge electrode must be sufficient to prevent arcing. Maximum deflection plate voltage is limited by voltage breakdown constraints which also must be considered with regard to the minimum deflection plate spacing as well as the separation between the charge electrode and the deflection plate. Additionally, clearance requirements between the upper deflection plate and the maximum height of the drop constrains minimum deflection plate spacing. In the IBM 66/40 Ink Jet Printer, for example, a deflection plate voltage of 3300 volts and a plate spacing of 1.6mm satisifies the requirements. Additionally, the required clearance at the deflection plate exit is obtained by slanting a portion of the top plate upward (See FIG. 1) which allows for maximum allowable electric field strength over most of the deflection length. As may be visualized from the formula given above, drop deflection increases with both $l_{dp}$ and $z_p$ but more rapidly with $l_{dp}$, the maximum value of $z_p$ being fixed either by mechanical constraints or by the fact that due to aerodynamic effects drops following similar trajectories tend to merge, a tendency that increases with increasing $z_p$. Obviously, the maximum of $l_{dp}$ is $z_p$, which means that the deflection plates extend to the paper plane. However, in practice, space is required to accommodate the gutter and a device for collecting fog to prevent deflection plate contamination. In the IBM 66/40 a 1.3cm deflection plate length and a 2.3cm throw distance were chosen to meet these requirements. Moreover, in that printer, the printed dot on paper is produced by a 0.063mm diameter drop, which, in turn, results from a 0.033mm jet diameter and a 0.15mm drop spacing. To meet the requirements for resolution, maximum print height and burst print rate the frequency of the drop generator is approximately 117kHz. (For a complete discussion of the mathamatics and other parameters which must be taken into account in an ink jet printer, see IBM J. RES DEVELOP. Vol. 21, No. 1, 1977).

In order to insure the proper placement of the drop or drops on the paper, the maximum deflected height of a drop on the paper must be monitored so as to permit compensation for such other parameters as ink drop viscosity and machine temperature. Moreover, an examination of the deflection formula given above indicates that the easiest way to adjust, within limits of course, for the deflected height of the drop is to adjust the velocity of the drop, the velocity of the drop being directly related to the pressure of the ink into the drop generator. Thus, if the height of the drop is too low (assuming maximum charge electrode voltage being applied to the drop) such that the maximum print character height is not correct, decreasing the pump pressure of the ink supply to the drop generator will permit the charge droplet to spend more time within the high voltage deflection plates and increase the deflected drop height. Conversely, if the drop is too high, and thus the character height is greater than the designed predetermined height, increasing pump pressure will increase the drop velocity and will cause the drop to spend less time between the deflection plates causing the drop to be not deflected as far in the printing plane. Of course, the equation given above will give many indications of the ways in which drop height may be controlled and thus the present invention concerns itself more with monitoring what the deflected drop is doing while suggesting one method of controlling the drop height by simply adjusting the pump pressure.

Briefly, the invention comprises the placement of first, second and third spaced apart, serially arranged sensor means which are positioned in a sensing plane which is substantially parallel to the deflection plane of the object, in the present instance an ink drop. At least one of the sensors is a line sensor and is positioned in the sensing plane for sensing the ink drop after the drop has been deflected, the line sensor being skewed with respect to the path of the deflected ink drops in the deflection plane. Timing means are connected to the sensors to compare the time of occurrence of a drop sensed between two of the sensor means and the third sensor means so as to give an indication as to whether the ink drop being sensed is high or low relative to a predetermined optimum height of the drop or object in the deflection plane.

In view of the above, it is a principle object of the present invention to provide a height sensing device which will accurately determine whether an object in flight is high or low relative to its predetermined trajectory.

Another object of the present invention is to provide a deflection height sensing device which will accurately determine whether a deflected object is high or low relative to its predetermined flight trajectory.

Another object of the present invention is to provide the sensing device of the present invention in an ink jet recording type apparatus in which the maximum deflection of a deflected ink drop may be easily determined so as to permit of a uniform height of the character printed on the printing media.

Still another object of the present invention is to provide a flexible ink drop height sensing device which may be positioned anywhere along the flight path of an ink drop as long as one portion of the sensing device is positioned to indicate the height of an ink drop after it has been deflected.

Yet another object of the present invention is to provide a height sensing device for an object which will optically determine the height of the trajectory of the object and emanate a signal to control one or more parameters of the trajectory causing means of the object to correct the flight path of the object to a predetermined trajectory or path.

Still another object of the present invention is to provide an ink drop height sensing device in which the height sensed will be compared to some predetermined optimum height automatically.

Other objects and a more complete understanding of the invention may be had by referring to the following specification and claims taken in conjunction with the accompanying drawings in which:

FIG. 1 is an enlarged fragmentary schematic side elevational view of an ink jet recording apparatus schematically showing the preferred position of an ink drop height sensing device constructed in accordance with the present invention;

Figure 10:
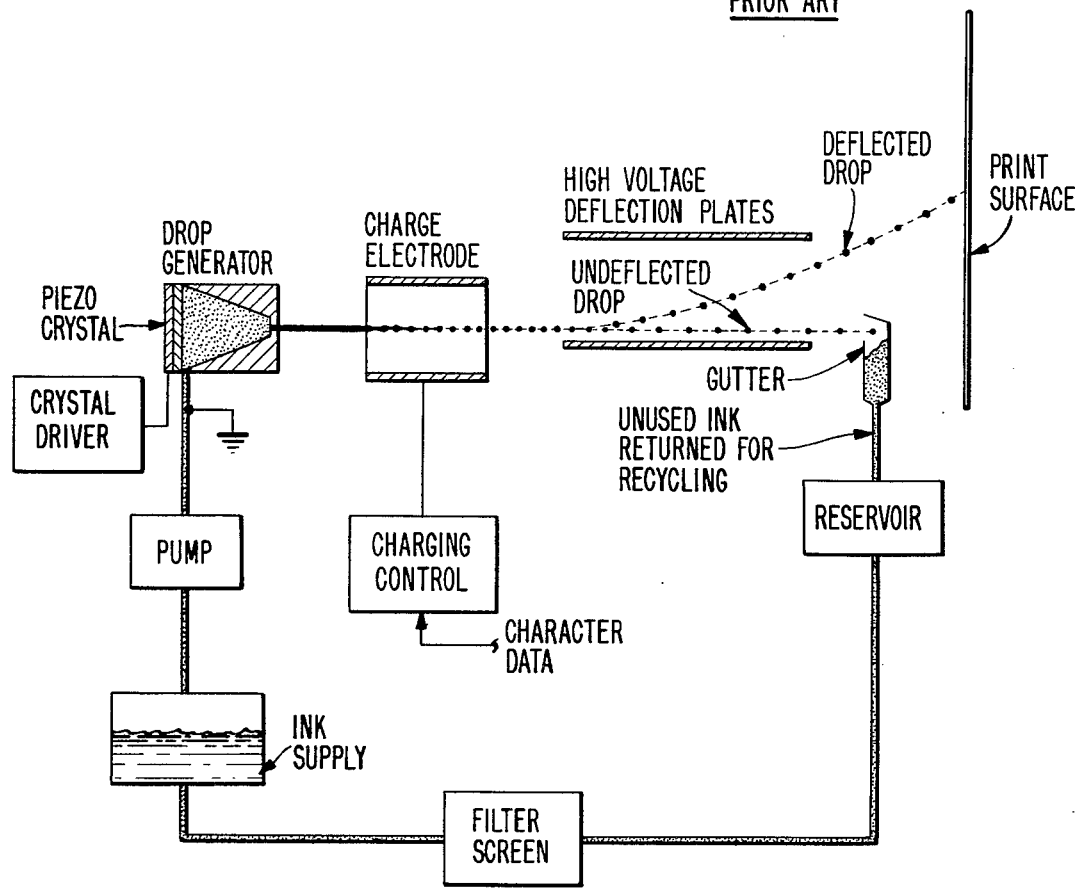
FIG. 10 is a diagram illustrating a known apparatus for electrostatically deflecting an ink jet for printing on a printed surface.

Referring now to the drawings, and especially FIG. 1 thereof, a portion of an ink jet printing apparatus 10 is shown therein. As illustrated, the printer comprises a carrier 11 having mounted thereon a drop generator 12 which is vibrated at a predetermined frequency to provide a stream or jet of ink drops through a nozzle 13. The perturbated stream breaks up into individual droplets whereupon they receive a charge or no charge from a charging electrode 14, the charge being proportional to the amount of deflection of the ink drops as desired in a vertical plane. In the illustrated instance, the drops are deflected in a vertical deflection plane as by high voltage deflection plates 15 and 16 respectively for placing the drops on a recording media 17 such as paper sheet and the like. Undeflected drops, as is conventional, may be captured in a gutter 18 which returns unused ink for supply to the drop generator and nozzle. (See FIG. 10) In the illustrated instance, the drops are deflected in a vertical plane while the carrier is moved horizontally (into and out of the paper) to effect character printing on the recording media 17. However, it should be recognized that the deflection plane may be oriented in any direction depending upon the desired scanning of the character onto the recording media.

Figure 2:
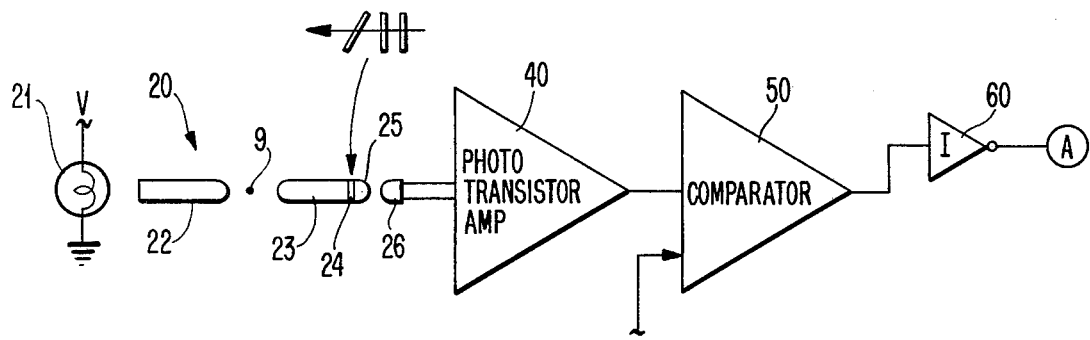
FIG. 2 is a schematic diagram illustrating a portion of the apparatus shown in FIG. 1 and coupled to electrical circuit means for amplifying and shaping detection pulses.
Figure 4:
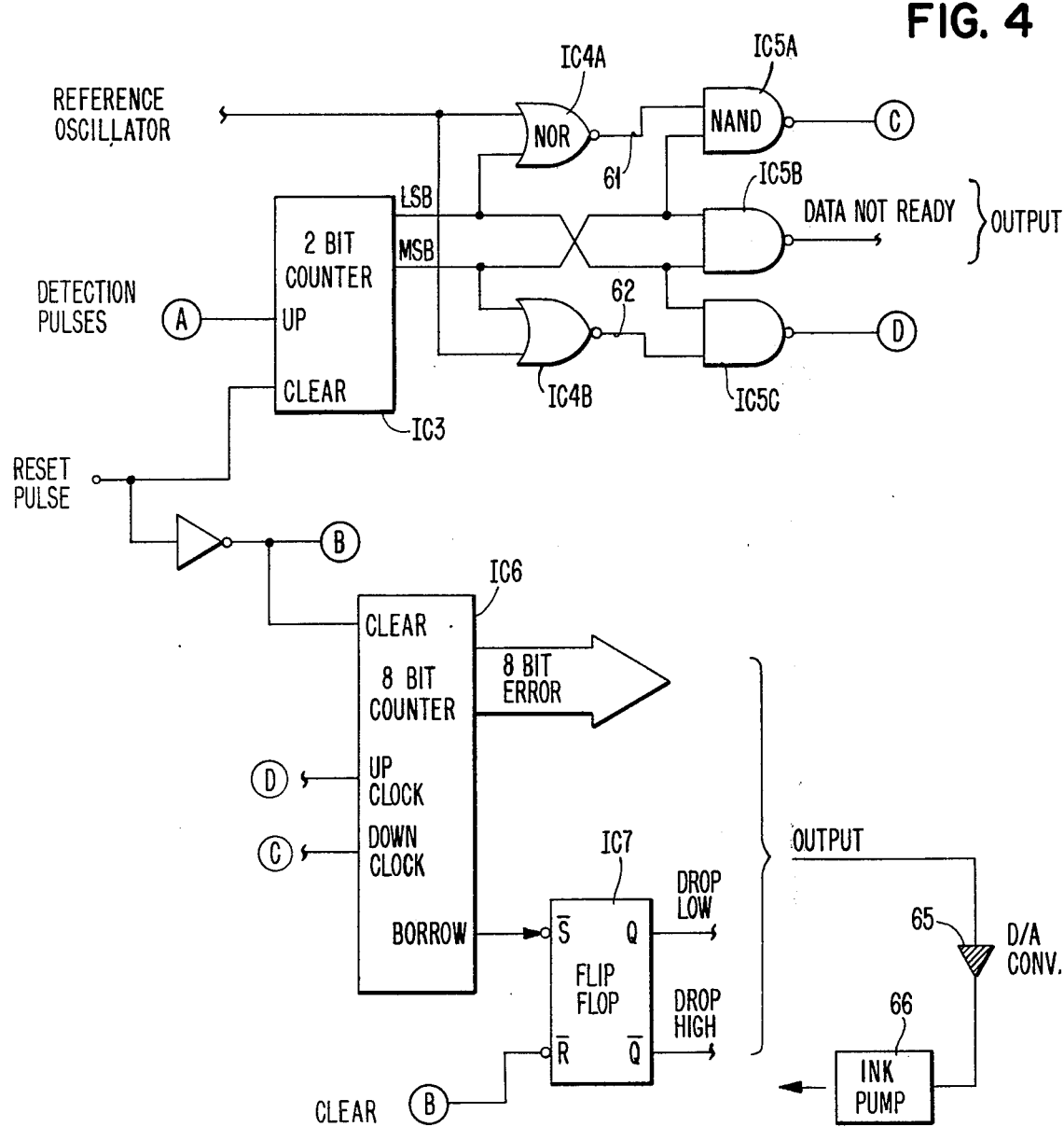
Figure 5:
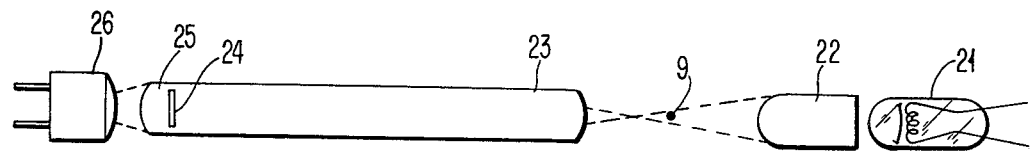
FIG. 5 is an enlarged schematic view of a portion of the apparatus illustrated in FIGS. 1 and 2.

In accordance with the invention, a height sensing device 20 having a plurality of sensors which are serially arranged, is positioned in a sensing plane which is substantially parallel to the deflection plane, at least one of the sensors being a line sensor and positioned in the sensing plane for sensing of an ink drop after the drop has been deflected so as to compare the time taken for the ink drop to pass between reference sensors to the time taken for the drop to pass by the third sensor, and for emitting an output determinative of whether the drop is high or low relative to its intended or predetermined path or trajectory 19. To this end, and referring now to FIGS. 1, 2 and 5, the sensing device 20 includes a source of illumination 21, a condensor lens 22 which focuses the light onto and through a zone in the deflection plane including the path or trajectory 19 of an ink drop 9 which has been deflected. An objective lens 23 focuses the light onto a mask 24 containing the serially arranged sensor means hereinafter described for projecting light and perturbations thereof through a condensor lens 25 to a light sensitive device such as a phototransistor 26. The phototransistor 26 functions as part of timing means which are connected thereto to compare the time of occurrence of a drop sensed between two of the sensor means to the time of occurrence of the drop past the third sensor means to thereby give an indication as to whether the ink drop being sensed is high or low relative to a predetermined height or trajectory of the drop in the deflection plane.

Figure 6:
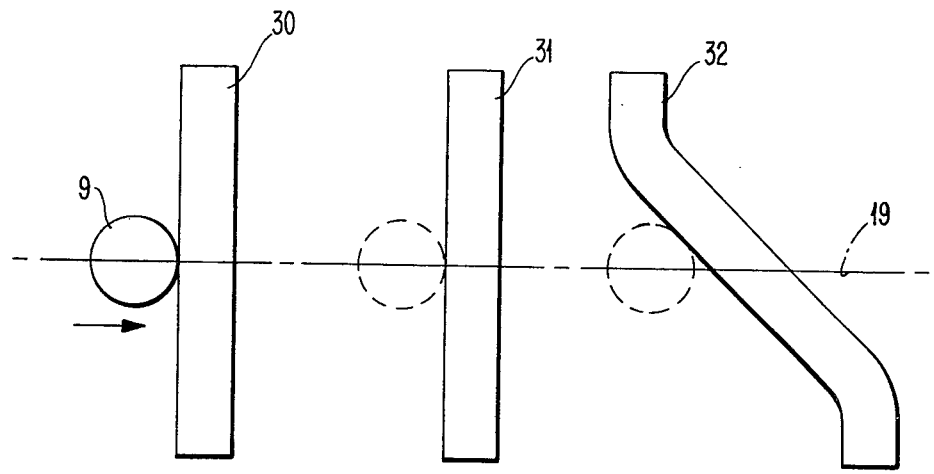
FIG. 6 is an enlarged front elevational view of one embodiment of the apparatus used to sense whether the trajectory of the path of the ink drop is high or low.

In the present instance, the mask 24 is opaque and contains three serially arranged, line sensor means or light projecting means 30, 31 and 32, in the present instance slots positioned in a sensing plane substantially parallel to the deflection plane. Two of the line sensor means, 30 and 31, being in parallel relation and the third 32 being skewed relative to the other two. As the ink drop 9 passes in front of the first line sensor 30 and interrupts the light transmission from light source 21 through the optics to the phototransistor 26, a first pulse or light interruption will be registered by the phototransistor. As the drop passes between the light source and the phototransistor and in front of the second line sensor 31, a second interruption will occur and the time of occurrence between the drop line sensors 30 and 31 may be recorded by any convenient timing means. Inasmuch as the line sensor 32 is skewed relative to the other two sensors, and more particularly skewed relative to the intended predetermined optimum path or trajectory 19 of the drop, the drop 9 passing in front of the slot or line sensor 32 interrupts the light path between the lamp or light source 21 and the phototransistor 26 gives an indication as to whether the drop is on the predetermined trajectory. For example, if, relative to FIG. 6, the distance between line sensor 31 and line sensor 32 along the flight path of the intended trajectory 19 is the same as the distance between line sensors 30 and 31, the time of passage of the droplet between line sensor 31 and line sensor 32 will be the same as the time passage of the drop between the line sensors 30 and 31. If the phototransistor 26 senses the light interruption at a time passage of less than the time passage of the drop between line sensors 30 and 31, inasmuch as the portion of the line sensor above the intended drop flight trajectory or path 19 is shorter, an indication of a drop high will be given. Alternatively, if the drop is low the time passage of drop sense between line sensors 31 and 32 will be longer as opposed to the time passage of drop sense between line sensors 30 and 31 of that same drop. If should be recognized that the line sensor 32 may be positioned any known distance from the sensor 31 as long as there is a known distance at some point along the skewed line which would give an indication of the proper time interval relative to the reference interval between line sensors 30 and 31. Thus line sensor 32 could be any distance from line sensor 31 or could even be located intermediate line sensor 30 and 31 as long as some time comparison is known distance wise between the three sensors at the optimum point of line path or trajectory of the ink drop 9.

Figure 7:
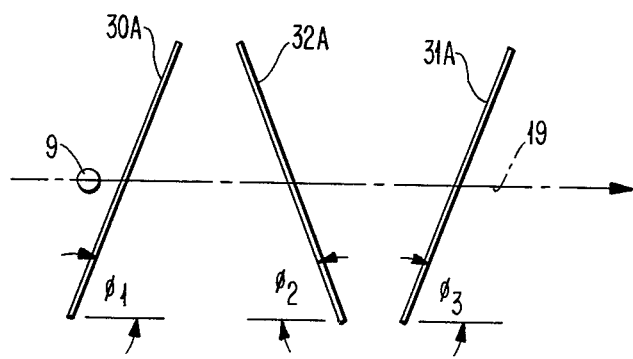
FIG. 7 is an enlarged front elevational view of another embodiment of sensing means to determine whether the path of an ink drop is high or low.

Another arrangement of line sensor means is illustrated in FIG. 7 wherein each of the line sensors 30a, 31a and 32a are skewed relative to the intended or predetermined path or trajectory 19 of the ink droplet 9. By maintaining two of the skewed lines 30a and 31a in parallel, no matter what the height of the interception of 30a and 31a by an ink droplet 9 trajectory path, the distance travelled by an ink drop between the sensors 30a and 31a will be the same. Moreover, if the drop is low, the distance between the sensing of the drop by line sensor 30a and the sensing by line sensor 32a will be longer than if the drop is higher above the trajectory path 19. Thus a comparison can be made between the time of drop travel between the line sensors 30a and 31a and the time of travel between 30a and 32a, or 32a and 31a. Moreover, if the angle $\phi 1 = \phi 2 = \phi 3$, the wave form of the output of the phototransistor will be the same for passage of the drop past each of the sensors making wave or pulse information more easily shaped for subsequent analysis by the timing circuit means.

It should be recognized that in effect only one of the sensors must be placed subsequent to deflection of the drop, and that sensor is preferably one of the sensors which is skewed relative to the predetermined flight path or trajectory 19 illustrated in the drawings. Thus for example, the first two sensors could be placed intermediate the charge electrode 14 and in the first portion of the deflection plate in the sensing plane, or both could be placed in the first portion of the deflection plates in the sensing plane prior to deflection of the ink drop, or could be placed anywhere along the intended flight deflection trajectory or path 19 as long as one of the three sensors is placed in a position to detect deflection created by the deflection plates. Moreover, if the first two sensors are placed in the sensing plane intermediate, for example, the charging electrode and the deflection plates or in the very first portion or early portion of the deflection plates (depending upon deflection design), then any type of sensor whether it be line, or dot or working on the principle of capacitance sensing may be employed as long as the two sensors have a predetermined distance between them and the third sensor such that the time of travel from the second sensor to the third will be of varying time quantity as the trajectory of the droplet is high or low compared to the predetermined trajectory path of the drop between the first two sensor.

Figure 4:
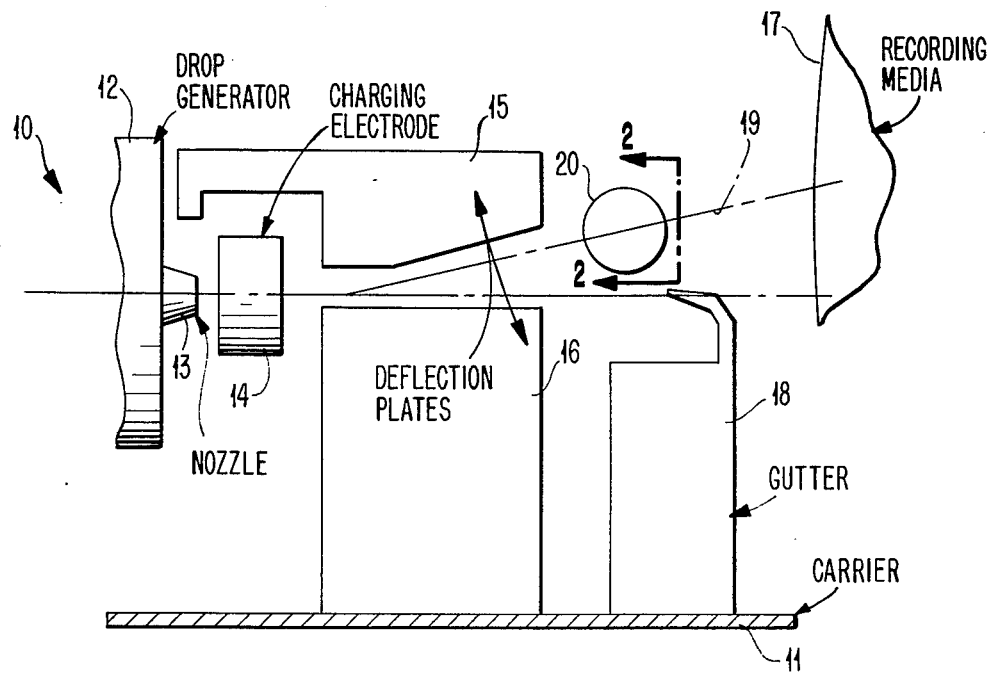
FIG. 4 is a schematic diagram illustrating circuitry which may be employed to give an output determinative of whether the drop is high or low from its intended trajectory or path.
Figure 8:
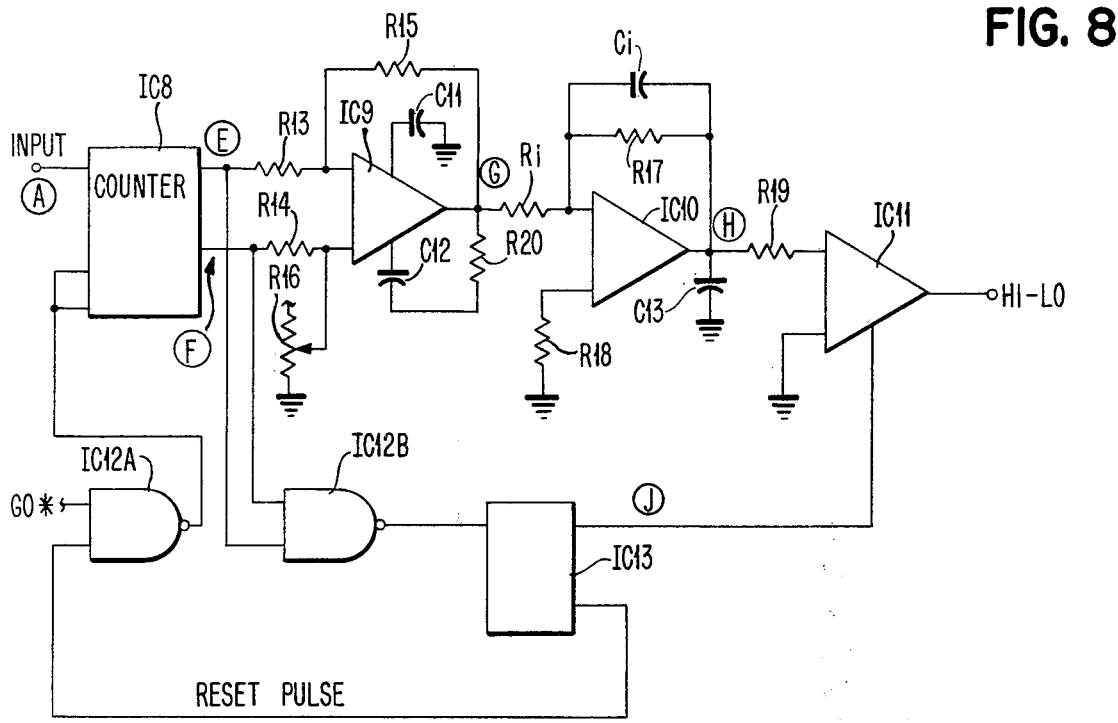
FIG. 8 is a schematic circuit diagram of another embodiment illustrating a circuit which may be employed to give an analog implementation of the time measurement from the circuitry shown in FIGS. 2 and 3.

The pulse like signals emanating from the phototransistor 26 may be operated upon in any convenient manner to give either a digital output as from the circuitry illustrated in FIG. 4 or an analog implementation with a digital output such as illustrated in the circuitry schematically set forth in FIG. 8. In essence, the pulses from the phototransistor indicating drop occurrence or coincidence with the sensors may first be amplified, for example in a phototransistor amplifier 40 (FIG. 2) and the wave forms may be shaped by suitable biasing and clipping as in a comparator or the like 50, inverted (if desired), in an invertor 60 and then fed through a digital circuit which merely measures the time, for example with reference to the line detectors illustrated in FIG. 6, of droplet passage between line sensors 30 and 31 and then the time of passage between line sensors 31 and 32 so as to indicate a high or low passage or trajectory of the ink drop 9 relative to the predetermined flight path or trajectory 19.

Figure 3:
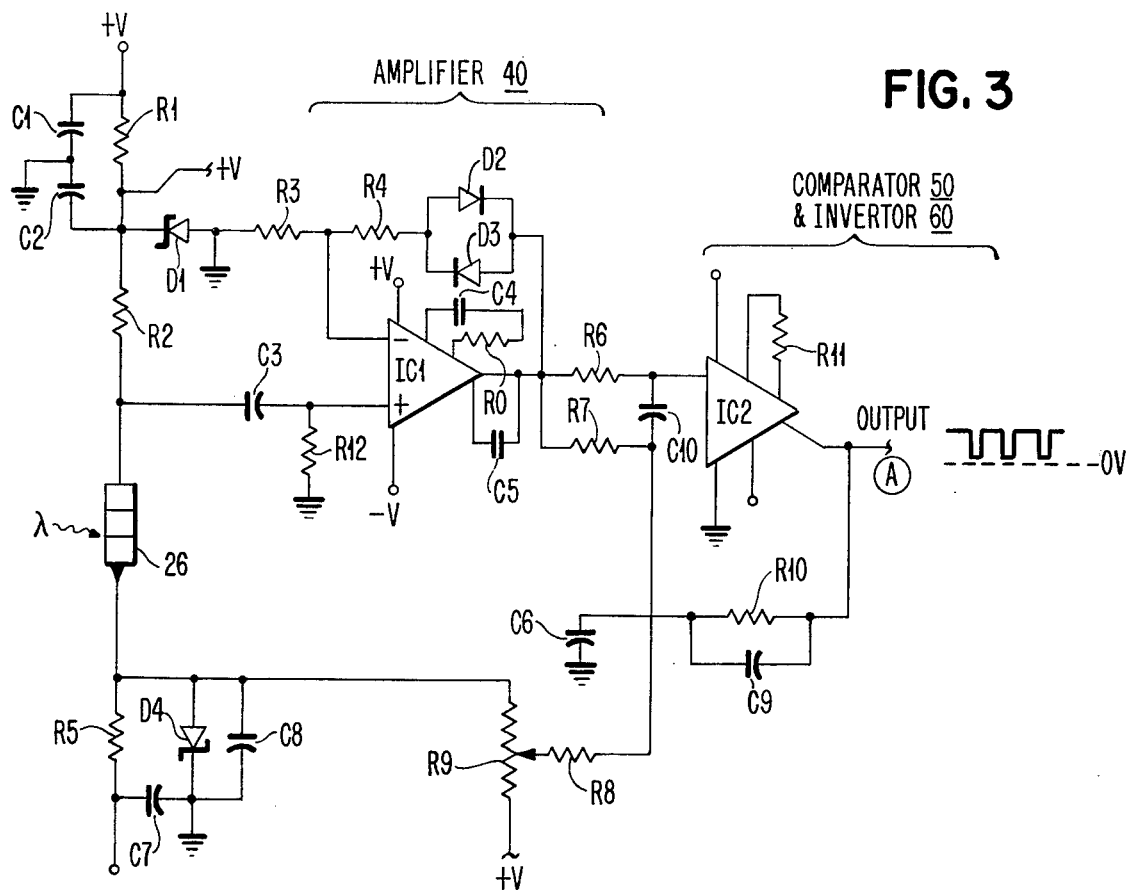
FIG. 3 is a more detailed schematic diagram of the portion of the electrical circuitry block diagrammed in FIG. 2.

A typical amplifier 40, comparator 50 and invertor 60 circuit is illustrated in FIG. 3. The collector current in phototransistor 26, for example, being reduced by the passage of an ink drop 9 and being sensed by, for example with reference to FIG. 6, the line sensor 30. This effects an up signal to IC1 and permits amplification thereof which is fed to a comparator circuit and module 50 comprising IC2 and its associated resistors and capacitors which serves to shape the wave form and provide a pulse type output as at A in FIG. 3. The wave form may also be inverted automatically by the comparator module IC2 which wave form is shown at A in the output of FIG. 3. Typical values for the circuit of FIG. 3, FIG. 4 and FIG. 8 are set forth in the table hereinafter.

If the handling of the pulses is to be digital, the timer means illustrated in FIG. 4 may be employed. To this end, and referring now to FIG. 4, a reference oscillator operating at a predetermined frequency, for example 7.5MHz, provides an input to an itegrated circuit NOR gate IC4A and IC4B, while the detection pulses from the output of the circuit, for example the circuit illustrated in FIG. 3, provides an input to a 2 bit counter IC3. Assuming that the circuit is clear and the counter IC3 contains 00, upon the occurrence of the first pulse from line sensor 30 upon coincidence of the drop 9, an output will be sent from IC3 along the least significant bit line labelled LSB. The reference oscillator provides an oscillating input to NOR gate IC4A and inasmuch as LSB is up, the output from the NOR gate as at 61 will be 0 or low. Inasmuch as the output from the most significant bit is 0, the NAND gate IC5A will have two low or zero inputs which will make the output C go up. At the same time, the reference oscillator is applying an input to the NOR gate IC4B and since its second input is at zero (from the most significant bit or MSB line), the output of NOR gate IC4B on line 62 will be the inverted reference oscillator signal oscillating at the clock or reference oscillator frequency and providing an input to IC5C. The second input to IC5C is from the least significant bit line which provides an up input to IC5C and therefore the output D of NAND gate IC5C is toggleing or oscillating at the clock or reference oscillator frequency. Nand gate IC5B, moreover, because of its up input due to the LSB input line and down input due to the MSB line gives a positive or up output indicating that the data is not ready for analysis. The output C and D from IC5A and IC5C respectively are fed to an 8 bit counter IC6, it being noted at this time that the output C from IC5A is up and therefore not effecting the counter. The output D which is essentially the reference oscillator drives the counters up clock input causing the counter to count up.

Upon the occurrence or coincidence of the ink drop 9 with the sensor 31, which is the second pulse output from the comparator invertor 50, 60 MSB goes up while LSB goes down from the 2 bit counter IC3. When this occurs, inasmuch as one input on IC4B is high and the other input is toggleing at the oscillator rate, the output from IC4B on line 62 goes to zero or low. Inasmuch as LSB is also low, both inputs to the NAND gate IC5C are low and its output on line D then goes up. When LSB goes low and MSB goes up, one input to nor gate IC4A is low while the other input is oscillating at the reference oscillator frequency and therefore the output on line 61 is the inverted reference oscillator signal. Inasmuch as MSB is up, one input to NAND gate IC5A is oscillating and the input to IC5A is at the up level, output C switches with the reference oscillator. Additionally, the NAND gate IC5B maintains its data not ready output or up output because LSB is now low and MSB is high not meeting the conditions of the NAND gate in order to get a zero output. With C toggleing and 0 up, the inputs to the 8 bit counter IC6 are reversed, and now the counter stops and goes in the opposite direction or starts counting down. By way of review, upon the occurrence or coincidence of the first pulse with line sensor 30, the input to the 8 bit counter IC6 causes the clock to count up and upon the oscillator reference input being shifted as upon the occurrence of the ink drop 9 coinciding with line sensor 31, the clock starts counting down.

Upon the occurrence of registration of the drop 9 with the skewed line sensor 32, both LSB and MSB go up making the outputs on lines 61 and 62 of the NOR gates IC4A and IC4B respectively zero or low, therefore providing an up output from IC5A and IC5C, and permitting the output from IC5B to go low indicating that the data is ready to examine. When this occurs, the eight bit counter IC6 will stop producing an 8 bit error signal which is indicative of the count that is left in the counter when output C and D of IC5A and IC5C are both up.

When the counter IC6 stops, the count observed at the 8 bit error output will indicate whether the count down time, i.e., the time from the drop passing line sensor 31 to the drop passing line sensor 32 was shorter or longer than the time passage of the drop from line sensor 30 to line sensor 31. Obviously if the drop was elevated above the predetermined trajectory line 19, the time of the drop to pass between sensors 31 and 32 is going to be shorter than the time for this drop to pass between sensors 30 and 31 and therefore the count less will be positive. If the count on the other hand is negative, it will indicate that the time for passage of the drop between line sensors 31 and 32 is greater than the time from lines 30 to line sensors 31 and accordingly, the drop will be low. In this manner, the operator may change one or more of the parameters associated with the ink jet printer to effect elevation or depression of the drop to bring it into and onto the predetermined and intended trajectory 19. For example, deflection voltage may be increased to increase deflection or decreased to decrease deflection whenever the count is indicated as being negative or positive.

The indication of whether the count is positive or negative may be displayed in any convenient way. For example, the error signal may be fed to a digital read out display, or may be employed to light lamps to indicate a high or low drop height.

Alternatively, a simple flip flop IC7 may be provided which, for example, normally sets at a drop high position such that a clear signal, for example a reset pulse (see output B) will set the flip flop at a high indication. Thus when the count left in the 8 bit error signal is positive, the flip flop will remain high, but when the count is low, that is the count down clock exceeds the count up clock, a borrow signal occurs that sets the flip flop IC7 to give a drop low indication.

The easiest and simpliest way to adjust the deflection of the drop is to control the velocity of the ink jet. This may easily be accomplished by increasing or decreasing the pump pressure (see FIG. 10) of the ink supply to the drop generator. To this end, and as illustrated on FIG. 4, the output of the flip flop may be applied to a digital to analog convertor 65 which includes logic circuitry to control the ink pump 66 and thereby increase or decrease the pressure output from the ink pump.

If desired, the logic level pulses from the output of the amplifier-comparator-invertor of FIG. 3 may be fed to an analog circuit such as illustrated in FIG. 8. In this circuit, the pulses are fed serially, in the same manner as heretofore described with referenced to FIG. 6, to the input of a two stage counter IC8. As will be noted in the diagram, various points labelled E, F, G, H and J are designated to correspond to various wave forms illustrated in FIG. 9. The output G of the unity gain amplifier IC9 is zero at time to inasmuch as both of its inputs are equal. A zero or low input to the integrator IC10 also causes its output to be low. When the first pulse arrives at time T1, and sets the first bit of the counter on, the input to the integrator IC10 is negative. The output therefore ramps positive at a rate controlled by the values of Ri and Ci respectively. (See wave form H in FIG. 9). The arrival of the second pulse causes the first bit of the counter to turn off while setting the second bit at output F high. The input polarity becomes positive but equal in voltage (adjusted to be equal by R16 initially), to the previous negative input. This causes the integrator IC10 to ramp negative at exactly the same rate. The arrival of the third pulse sets both bits of the counter to up. A NAND circuit which includes IC12B, decodes the third pulse and triggers the single shot IC13 which applies a narrow strobe pulse 65 at time T3 to a comparator IC11. At the strobe time, the comparator output will indicate whether the integrator output is above or below zero which in turn indicates if the drop is high or low, once again relative to the line sensor design illustrated in FIG. 6.

Figure 9:
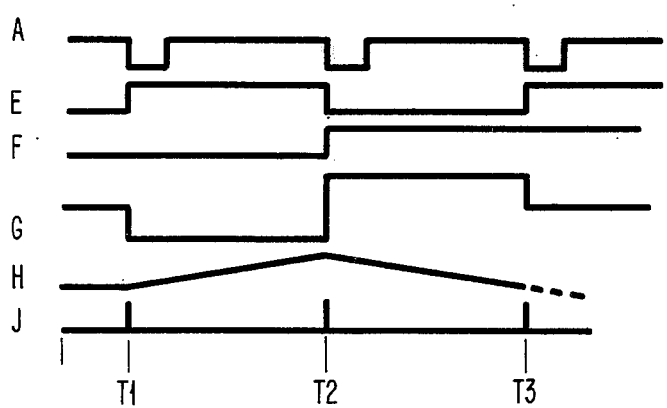
FIG. 9 is a wave form diagram illustrating the wave form in the circuitry of FIG. 8 at various portions thereof.

An analog voltage proportional to the error in trajectory may be obtained from wave form H illustrated in FIG. 9 by using an appropriate circuit such as a sample and hold at the time of sensing the third pulse. To compensate for variations in object velocity this output must be scaled by the peak voltage in the wave form.

It should be noted that this high low indication once again may be utilized in the same manner as that high low indication from FIG. 4 to control the ink jet pump to increase or decrease the pressure output of the pump and therefore increase or decrease the velocity of the ink drops.

Moreover, it should be recognized that the velocity of the ink jet streams of drops may be determined from apparatus described and taught in Ser. No. 843,081, filed Oct. 17, 1977, which is herein incorporated by reference. Once the ink drop height has been adjusted to its predetermined optimum height or trajectory as along path 19, the velocity of the liquid stream of droplets may be determined as by the above identified patent application, and then that velocity kept in memory so that the ink jet pump pressure may be servoed to be maintained at that pressure to maintain the velocity of the ink jet so that the height of the ink drop will be maintained along the predetermined optimum height or deflection path 19. In this manner, it is a simple manner to merely check the height with the apparatus of the present invention occassionally to insure that drift has not occurred due to some other drifting parameters such as deflection voltage etc. (see the formula set forth in the "Summary and State of the Prior Art" section of this patent).

Thus the present invention provides an elegant way of determining the deflected height of an object, and particularly an ink jet type printer so as to maintain a selected and desired optimum trajectory or path of the object or ink drop.

TYPICAL VALUES OF THE CIRCUITS DEPICTED IN FIGS. 3, 4 and 9

FIG. 3
*RO - 1.5k

| | | |
|---|---|---|
| R1 -220 | C1 - 5.6 uf | |
| R2 - 2.2k | C2 - 1 uf | |
| R3 - 150 | C3 - .0033 uf | |
| R4 - 10k | C4 - 100 Pf | |
| R5 - 220 | C5 - 4.7 Pf | |
| R6 - 2.2 | C6 - .0015 uf | |
| R7 - 2.2k | C7 - 5.6 uf | |
| R8 - 7.5k | C8 - 1 uf | |
| R9 - 5k Pot | C9 - 100 Pf | |
| R10 - 200k | C10 - 68 Pf | |
| R11 - 3.3k | | |
| R12 - 2.2k | | |
| PTX - Photo Transistor (26) | | D1, D4-6 V Zenar |
| IC1 - LM-709 National Semiconductor | | D2, D3 - Diodes |
| IC2 - NE-527 Signetics | | |

FIG. 4
IC3 - 74193 (8 bit counter, used as 2 bit)
IC4 - 7402 (4 NOR, uses 2)
IC5 - 7400 (4 NAND, uses 3)
IC6 - 74193 (8 bit counter)
IC7 - 7400 (4 NAND, uses 2)

FIG. 9

| | | |
|---|---|---|
| R13 - 10k | R18 - 10k | C11 - .1 uf |
| R14 - 10k | R19 - 2.2k | C12 - 10 Pf |
| R15 - 10k | R20 - 5.6k | C13 - 250 Pf |
| R16 - 10k Pot | Ri - 47k | Ci - 100 Pf |
| R17 - 3M | | |
| IC - 8 - 7493 | T.I. | |
| IC - 9 - LM 318 | Nat. Semiconductor | |
| IC - 10 - LM 318 | Nat. Semiconductor | |
| IC - 11 - 527 | Nat. Semiconductor | |
| IC - 12 - 7400 | Nat. Semiconductor | |
| IC - 13 - 74121 | T.I. | |

*All resistory in ohms unless otherwise stated.

Although the invention has been described with a certain degree of particularity, it is understood that the present disclosure has been made only by way of example and that numerous changes in the details of construction and the combination of arrangement of parts may be made without departing from the spirit and scope of the invention as hereinafter claimed:

What is claimed is:

1. An ink drop height sensing device for an ink jet recording apparatus, said apparatus including nozzle means for forming and propelling a stream of ink drops towards a recording media in a predetermined deflection plane, means to apply a charge to an ink drop, and means for deflecting said charged ink drop in said deflection plane; first, second and third serially arranged sensor means positioned substantially in a sensing plane essentially parallel to the deflection plane for sensing serially the passage of an ink drop, at least one of said sensors being a line sensor and positioned for sensing of an ink drop after said ink drop has been deflected, said line sensor being skewed with respect to the path of said deflected ink drop in said deflection plane so that at least a portion of said line sensor is closer and another portion is farther than the next adjacent sensor in said plane, and timing means coupled to said sensors to compare the time of occurrence of a drop sensed between two of said sensor means and the third sensor means to thereby give an indication as to whether the ink drop being sensed is high or low relative to a predetermined optimum height of said drop in said deflection plane.

2. An ink drop height sensing device in accordance with claim 1 wherein all of said sensors means comprise line sensors.

3. An ink drop height sensing device in accordance with claim 2 wherein said line sensors comprise slots in an opaque mask, said mask being positioned in said sensing plane for projecting light and pertabations of light therethrough.

4. An ink drop ehgith sensing device in accordance with claim 3 including a source of illumination on one side of said deflection plane and said sensing plane is on the opposite side of said deflection plane.

5. An ink drop height sensing device in accordance with claim 1 wherein said timing means includes electrical light responsive means adjacent said mask for receiving and transmitting electrical signals responsive to pertabations in light projecting through said mask.

6. An ink drop height sensing device in accordance with claim 5 including means to amplify and shape said electrical signals transmitted by said light responsive means.

7. An ink drop height sensing device in accordance with claim 6 including counter means, reference oscillator means, means for gating said reference oscillator to said counter means upon the receipt of a first pertabation, to effect counting in one direction in said counter means; means to gate said reference oscillator to said counter means in an opposite count direction upon the receipt of a second pertabation; and means to stop said counter upon the receipt of a third pertabation, whereby said counter means emits a signal indicative of the counting times between said pertabations.

8. An ink drop height sensing device for an ink jet recording apparatus, said apparatus including nozzle means for forming and propelling a stream of ink drops towards a recording media in a predetermined deflection plane; first, second and third, spaced apart, serially arranged, line sensor means positioned in a plane substantially parallel to the deflection plane, two of said line sensor means being in parallel relation and the third being skewed relative to said other two, and timing means connected to said sensors to compare the time of occurrence of a drop sensed between two of said line sensor means and the third line sensor means to thereby give an indication as to whether the ink drop being sensed is high or low relative to a predetermined optimum height or deflection trajectory of said drop in said deflection plane.

9. An ink drop height sensing device in accordance with claim 8 wherein said ink jet recording apparatus includes a charge electrode adjacent said nozzle means for applying a charge to said ink drops, and charged drop deflection plates adjacent said charge electrode for deflecting charged ink drops in accordance with the magnitude of their charge.

10. An ink drop height sensing apparatus in accordance with claim 9 wherein said line sensor means are positioned in said plane subsequent to the deflection of said drop by said deflection plates.

11. An ink drop height sensing apparatus in accordance with claim 10 including a source of illumination on one side of said deflection plane, a mask on the opposite side of said deflection plane in the path of illumination from said source of illumination, said line sensor means comprising slots in said mask, and a light sensitive means adjacent said mask for receiving light transmitted through said slots in said mask and pertabations in light transmitted due to the passage of ink drops in said deflection plane.

12. An ink drop height sensing apparatus in accordance with claim 11 wherein said light sensitive means comprises at least a phototransistor capable of converting light to an electrical current, said timing means further including means to amplify and shape said electrical signals transmitted by said light responsive means.

13. An ink drop height sensing device for an ink jet recording apparatus said apparatus including nozzle means for forming and propelling a stream of ink drops towards a recording media in a predetermined maximum trajectory path, and means to selectively deflect said stream of ink drops to effect a scan of said drops on said recording media; sensor means adjacent said stream of ink drops; light source means on one side of said stream of ink drops and light detection means on the opposite side of said stream; said sensor means comprising an opaque mask intermediate the light path of said light source means and said light deflection means; first, second and thrid serially arranged light projecting means on said mask for passing light in said light path onto said detection means for permitting detection of light by said detection means; at least two of said light projecting means being a predetermined distance apart, and the other of said light projecting means being at an angle with respect to said first two but having at least one point thereon located some ratio of said predetermined distance; timing means coupled to said detection means for determining the time taken for a light path interruption to occur due to the passage of a drop across said predetermined distance, and means to determine the time taken for said same drop to pass from one of said light projecting means to the other of said light projecting means, and means to compare the time of said drop passage over said predetermined distance with respect to said finite ratio of distance and means to indicate whether said comparison is high or low.

14. An ink drop height device in accordance with claim 13 including means coupled to said nozzle means to alter the velocity of said stream in accordance with the indication of whether the comparison is high or low.

15. An ink drop height sensing device in accordance with claim 13 wherein said light projecting means comprises slots.

16. An ink drop height sensing device in accordance with claim 15 wherein said first and second slots are parallel to each other.

17. An ink drop height sensing device in accordance with claim 16 wherein said first and second slots are essentially perpendicular to the trajactory path.

18. An ink drop height sensing device in accordance with claim 15 wherein said first and third slots are parallel to each other.

19. An ink drop height sensing device in accordance with claim 18 wherein said first, second and third slots are skewed with respect to said trajectory path.

20. An ink jet printer in which ink drop velocity is a function of deflection height, a sensor apparatus for determining the deflected height of an ink drop, said apparatus comprising: a light source on one side of the intended path of trajectory of an ink drop; a mask on the opposite side of said path and aligned with said light source, and lens means intermediate said light source and said mask for focusing light toward said mask, first second and third spaced apart, serially arranged slots in said mask, at least two of said slots being in parallel relation to each other and the other of said slots being inclined with respect to said parallel slots and positioned with respect to the other two slots so that a predetermined point along its length, it is a predetermined distance from its next adjacent slot relative to the distance between said two parallel slots; light sensing means behind said mask aligned with said slot and responsive to interruptions in the path of light from said light source through said slot; means responsive to said interruptions for determining the first time interval for the passage of a drop between the parallel slots, and a second time interval of the drop between one of the slots and the inclined slot, and means for comparing said first and second time intervals to determine the trajectory of said drop relative to a predetermined trajectory.

21. An ink drop height sensing device for an ink jet recording apparatus, said apparatus including nozzle means forming and propelling a stream of ink drops towards a recording media in a predetermined trajectory path; means to charge said ink drops and means to deflect said ink drops to form a scan of said ink drops in accordance with the charge on said drops; first, second and third, serially arranged sensor means positioned adjacent said path; two of said sensors positioned to emit reference signals upon detection of an ink drop and the other of said sensor means positioned to emit a position signal when said ink drop is detected thereby; timing means to compare the time of occurrence of said reference signals to the time of occurrence of said position signal, and means to indicate whether said drop is high or low as compared to a predetermined optimum trajectory of said drop.

22. An ink drop height sensing device in accordance with claim 21 wherein at least one of said sensors in an optical sensor.

23. An ink drop height sensing device in accordance with claim 21 wherein said sensors are arranged in a plane parallel to the plane of the intended trajectory path.

24. An object in flight trajectory height sensing apparatus, comprising in combination: at least three serially arranged sensor means for sensing serially the passage of an object in flight and defining a sensing plane essentially parallel to the intended plane of trajectory of said object, at least one of said sensor means being a line sensor positioned in said sensing plane and skewed with respect to the intended flight trajectory while defining a zone of sensing above and below said intended flight trajectory path; and timing means coupled to said sensor means to compare the time lapse of an object passing and sensed by two of said sensors with the time lapse between an object sensed by said line sensor and any of one of the other two sensors to thereby give an indication of the height of said object relative to a predetermined optimum height of said object in its flight trajectory.

25. An oject in flight trajectory height sensing apparatus in accordance with claim 24 wherein each of said sensors comprises a line sensor.

26. An object in flight trajectory height sensing apparatus in accordance with claim 25 including an opaque mask, said line sensors comprising slots in said mask, illuminating means on one side of said intended plane of trajectory of said object, said mask being in said sensing plane on the opposite side of said plane of trajectory and aligned with said source of illumination, and means aligned with said slots in said mask for detecting light passage and pertabations thereof through said slots.

27. An object in flight trajectory height sensing apparatus in accordance with claim 25 wherein at least two of said line sensors are in parallel relation, one to the other.

28. An object in flight trajectory height sensing apparatus in accordance with claim 27 wherein said two parallel slots are essentially perpendicular to the intended trajectory of said object.

29. An object in flight trajectory height sensing apparatus in accordance with claim 27 wherein said line sensors are each skewed with respect to the intended trajectory of said object.

* * * * *